United States Patent
Penney et al.

(10) Patent No.: US 10,269,441 B1
(45) Date of Patent: Apr. 23, 2019

(54) SYSTEMS AND METHODS FOR THRESHOLD VOLTAGE MODIFICATION AND DETECTION

(71) Applicant: Micron Technology, Inc., Boise, ID (US)

(72) Inventors: Daniel B. Penney, Wylie, TX (US); William C. Waldrop, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/049,411

(22) Filed: Jul. 30, 2018

Related U.S. Application Data

(63) Continuation of application No. 15/789,167, filed on Oct. 20, 2017.

(51) Int. Cl.
| | |
|---|---|
| *G11C 11/24* | (2006.01) |
| *G11C 17/18* | (2006.01) |
| *H04L 9/08* | (2006.01) |
| *G11C 17/16* | (2006.01) |
| *G11C 17/08* | (2006.01) |

(52) U.S. Cl.
CPC .............. *G11C 17/18* (2013.01); *G11C 17/16* (2013.01); *H04L 9/0816* (2013.01); *G11C 17/08* (2013.01)

(58) Field of Classification Search
CPC . G11C 11/404; G11C 11/405; G11C 11/4074; G11C 11/4091
USPC ........................................................ 365/149
See application file for complete search history.

(56) References Cited

U.S. PATENT DOCUMENTS

| | | | |
|---|---|---|---|
| 6,992,928 | B2 | 1/2006 | Inoue |
| 9,236,125 | B2 * | 1/2016 | Yao .................... G11C 16/0433 |
| 2003/0204741 | A1 | 10/2003 | Schoen et al. |
| 2004/0095799 | A1 | 5/2004 | Jacob et al. |
| 2010/0135065 | A1 | 6/2010 | Ito et al. |
| 2014/0282210 | A1 | 9/2014 | Bianconi |

* cited by examiner

*Primary Examiner* — Son T Dinh
(74) *Attorney, Agent, or Firm* — Fletcher Yoder, P.C.

(57) ABSTRACT

A memory device includes a memory array of a set of memory cells. Each memory cell of the set of memory cells includes at least one transistor and at least one capacitor. The memory array includes at least one programmed memory cell. The programmed memory cell is selectively programmed by applying hot-carrier injection (HCI) to a transistor of the programmed memory cell. The programmed memory cell may provide an indication of pattern data that may be used to facilitate functionality such as data encryption, data decryption, implementation of a particular memory device operation mode, and/or machine-implemented instructions.

19 Claims, 5 Drawing Sheets

SYSTEMS AND METHODS FOR THRESHOLD VOLTAGE MODIFICATION AND DETECTION

CROSS REFERENCE TO RELATED APPLICATIONS

This application is a Continuation and claims priority to U.S. patent application Ser. No. 15/789,167, filed Oct. 20, 2017, which is herein incorporated by reference.

BACKGROUND

1. Field of the Invention

The present disclosure is generally related to memory device programming. More specifically, the present disclosure is related to one-time programming of memory devices.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Conventional memory devices may include fuses/anti-fuses to provide configuration settings for the memory device. However, these fuses/anti-fuses may occupy a significant area of the memory device. As memory device suppliers aim to minimize the size and maximize the storage capacity of these memory devices, it is desirable to reduce the memory device area occupied by configuration setting mechanisms, while maintaining the ability to provide configuration settings on the memory device.

BRIEF DESCRIPTION OF THE DRAWINGS

Various aspects of this disclosure may better be understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. In other words, the operational gate voltages of the transistors are higher than the change in the threshold voltage (Vth) caused by the HCI, such that the transistors continue to function properly during normal operation.

As will be discussed in detail below, the present disclosure generally relates to one-time programming of memory device arrays. The one-time programming provides unalterable configuration settings for a memory device that may be used by memory device processes. For example, in one embodiment, the one-time programming may be used as an encryption/decryption key for memory device encryption/decryption processes. In certain embodiments, the one-time programming may provide complementary functionality for an electronic device that uses the memory device. For example, the one-time programming may specify a boot-up routine for an electronic device coupled to the memory device. In some embodiments, other memory device settings (e.g., mode indicators, etc.) may be provided by the one-time programming.

Keeping the foregoing in mind, the present disclosure describes systems and techniques that may be implemented to provide a one-time programming of a memory device array to provide for the aforementioned advantages. Although certain systems or techniques detailed below are described independently with respect to other systems or techniques, it should be noted that each of the systems and techniques described herein may be implemented with various other systems and techniques also described herein.

Figure 1:
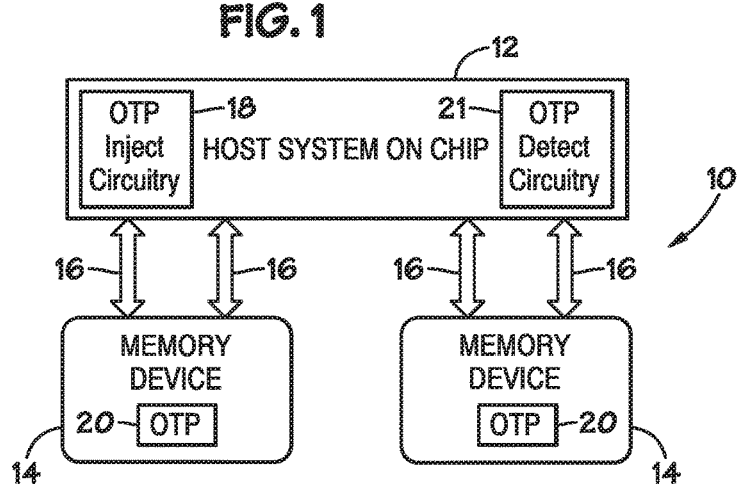
FIG. 1 illustrates a block diagram of an example of a computing system, in accordance with an embodiment.

Turning now to the drawings, FIG. 1 illustrates a block diagram of a computing system 10 that may employ various techniques and systems described herein. The computing system 10 may be any of a variety of computing devices, such as a computer, cellular phone, personal organizer, control circuit, etc. The computing system 10 may include a host system on chip (SoC) 12 that may be coupled to a number of memory devices 14. The host SoC 12 may be an integrated circuit (IC) that integrates all components of a computer or other electronic system into a single chip. As such, the host SoC 12 may include one or more processors, such as a microprocessor, that may control the processing of system functions and requests in the computing system 10.

As mentioned above, the host SoC 12 may be coupled to the memory devices 14. In certain embodiments, the host SoC 12 may be coupled to the memory devices 14 via channels 16. The channels 16 may include buses, electrical wiring, or the like. The host SoC 12 (or other computing device coupled to the memory devices 14) may include a one-time programming (OTP) injection circuitry 18, which may inject an OTP 20 into the memory device 14. For example, as will be discussed in more detail below, the OTP injection circuitry 18 may use hot-carrier injection (HCI) to generate an OTP pattern in transistors of a memory array of the memory devices 14.

As may be appreciated, hot carrier injection (HCI) is a phenomenon in solid-state electronic devices where an electron or a "hole" gains sufficient kinetic energy to overcome a potential barrier necessary to break an interface state. Since the charge carriers can become trapped in the gate dielectric of a MOS transistor, the switching characteristics of the transistor can be permanently changed.

Hot-carrier injection is one of the mechanisms that typically adversely affects the reliability of semiconductors of solid-state devices. However, in the current embodiments, this typically troublesome phenomenon is used in a beneficial manner, deliberately injecting the HCI into a memory device array to form a meaningful pattern of transistors that are altered by the HCI. Because memory array transistors typically receive relatively high-voltages at their gates, the HCI patterning may provide a benefit of providing an OTP 20, while the transistors may continue to function properly in normal operating mode.

Once the OTP 20 is generated in the memory array of the memory device 14, the OTP 20 may be read and used to facilitate subsequent data processing. For example, OTP detection circuitry 21 may be used to detect the OTP 20 in the memory arrays of the memory devices 14. Based upon the detected OTP 20, additional functionality may be performed. For example, as discussed herein, the OTP 20 may be used as an encryption/decryption key for memory device 14 data security processing, the OTP 20 may be used to indicate operating modes, etc. of the memory device 14, and/or the OTP 20 may indicate electronic device operating instructions (e.g., a boot sequence), etc. In some embodiments, the OTP 20 may repeat all or some portions of the OTP 20 for program redundancy.

Figure 2:
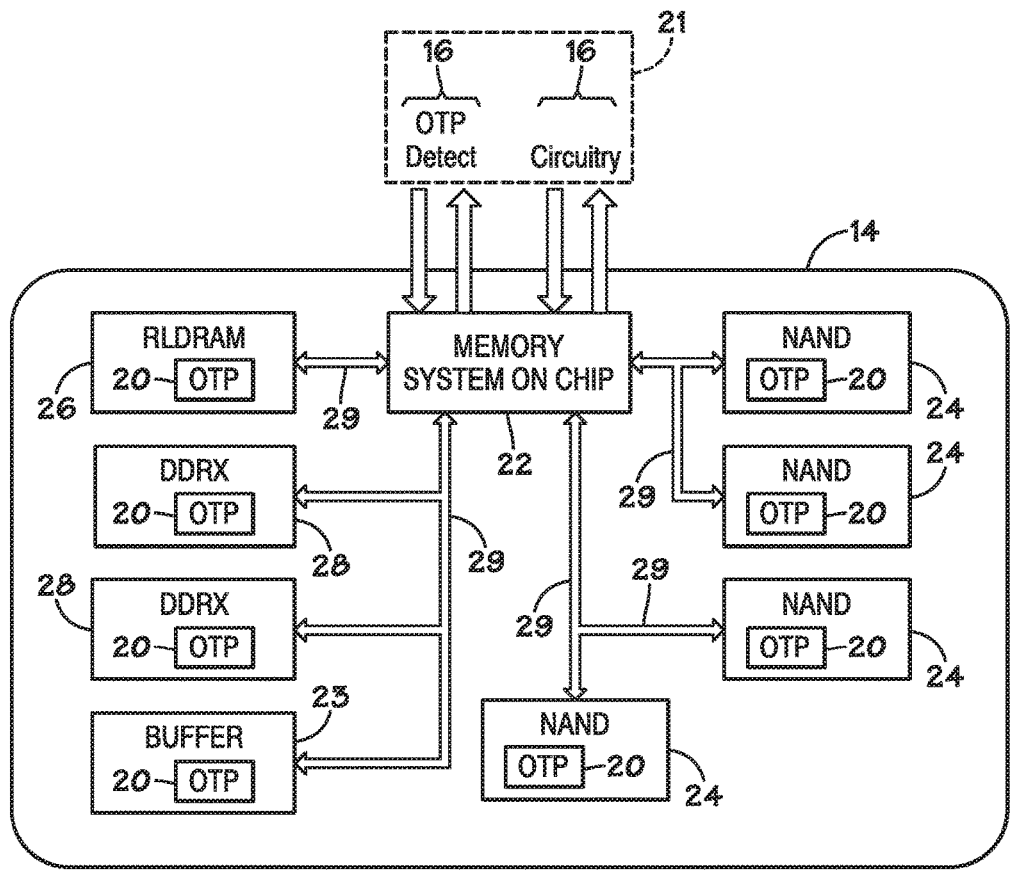
FIG. 2 illustrates a block diagram of an example of a memory device which may be part of the computing system of FIG. 1, in accordance with an embodiment.

FIG. 2 depicts a block diagram of an embodiment of the memory device 14. The memory device 14 may include any storage device designed to retain digital data. The memory device 14 may encompass a wide variety of memory components including volatile memory and non-volatile memory. Volatile memory may include Dynamic Random Access Memory (DRAM) and/or Static Random Access Memory (SRAM). Moreover, the volatile memory may include a number of memory modules, such as single inline memory modules (SIMMs) or dual inline memory modules (DIMMs).

The non-volatile memory may include a read-only memory (ROM), such as an EPROM, and/or flash memory (e.g., NAND) to be used in conjunction with the volatile memory. Additionally, the non-volatile memory may include a high capacity memory such as a tape or disk drive memory. As will be appreciated, the volatile memory or the non-volatile memory may be considered a non-transitory tangible machine-readable medium for storing code (e.g., instructions).

As shown in FIG. 2, in certain embodiments, the memory device 14 may include a system on chip (SoC) 22 that may be any suitable processor, such as a processor-in-memory (PIM) or a computer processor (CPU), tightly coupled to the memory components stored on the memory device 14. Generally, the memory SoC 22 may be on the same silicon chip as the memory components of the memory device 14. By merging the processing and memory components into the memory device 14, the memory SoC 22 may manage the manner in which data requests and responses are transmitted and received between the memory components and the host SoC 12. In certain embodiments, the memory SoC 22 may control the traffic between the memory components to reduce latency and increase bandwidth. As will be appreciated, the host SoC 12 and the memory SoC 22 may employ a scalable memory system protocol when controlling the transmissions between memory components and other devices in accordance with embodiments described herein. As such, the scalable memory system protocol may be operating on the channels 16 between the memory device 14 and the host SoC 12, as well as on channels 29 between the memory components and the memory SoC 22.

In certain embodiments, the memory device 14 may also include a buffer 23. The buffer 23 may store one or more packets received by the memory SoC 22. By way of example, the memory device 14 may include memory types such as NAND memories 24, Reduced-latency Dynamic random access memory (RLDRAM) 26, a generation of double data rate synchronous dynamic random-access memory (DDRX) 28 (e.g., DDR4 or DDR5), and the like.

In certain embodiments, the host SoC 12 and the memory SoC 22 may perform various operations based on computer-executable instructions provided via memory components, registers, and the like. The memory components or storage may be any suitable articles of manufacture that can serve as media to store processor-executable code, data, or the like. These articles of manufacture may represent computer-readable media (i.e., any suitable form of memory or storage) that may store the processor-executable code used by the host SoC 12 or the memory SoC 22 to perform the presently disclosed techniques. The memory and the storage may also be used to store the data, analysis of the data, and the like. The memory and the storage may represent non-transitory computer-readable media (i.e., any suitable form of memory or storage) that may store the processor-executable code used by the host SoC 12 or the memory SoC 22 to perform various techniques described herein. It should be noted that non-transitory merely indicates that the media is tangible and not a signal.

As mentioned above, the memory device 14 may be altered with a one-time programming (OTP) 20. In particular, as discussed in detail below, the OTP 20 may be implemented by generating a pattern using hot-carrier injection (HCI). The HCI causes voltage threshold (Vth) modifications in transistors of a memory array of the memory device 14. The OTP detection circuitry 21 may then detect this pattern within the memory array and implement a variety of functionalities based upon the pattern, as discussed herein.

Figure 3:
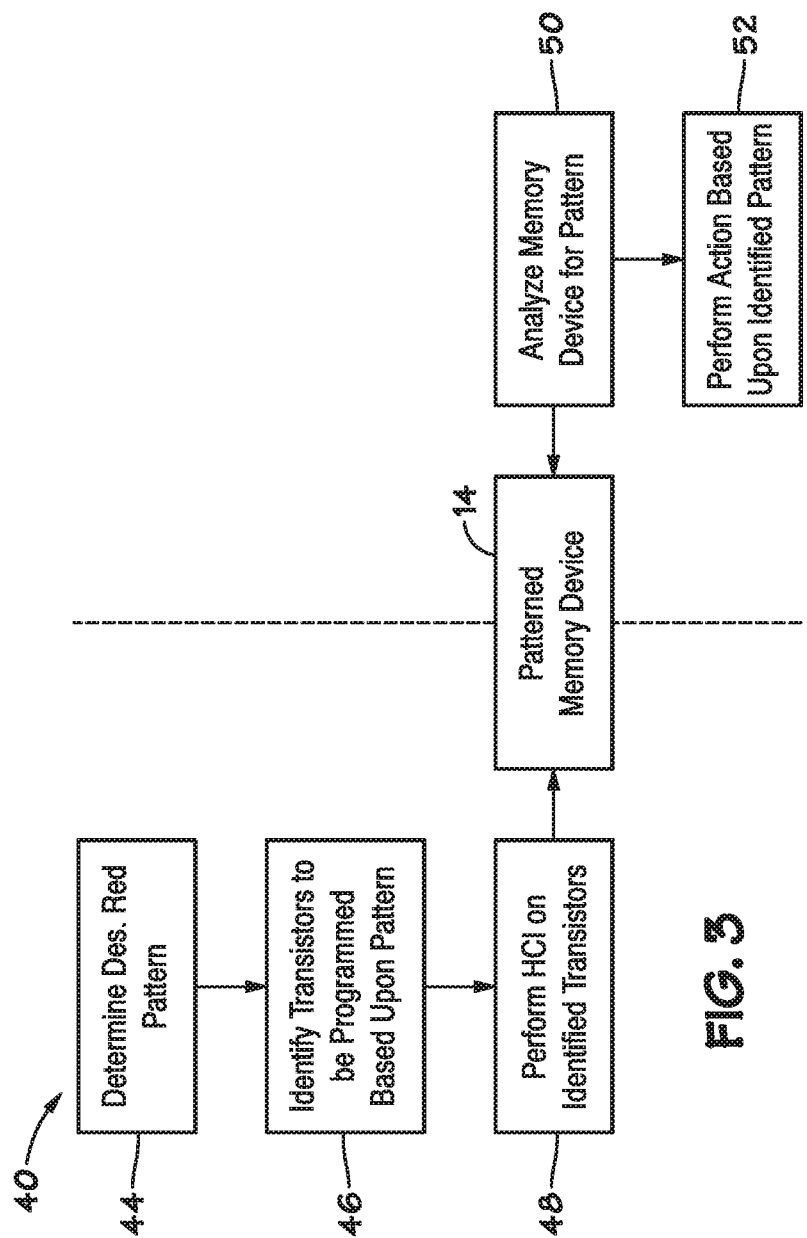
FIG. 3 is a flow chart illustrating processes for introducing a one-time programmed pattern into a memory device and using the programmed pattern, in accordance with an embodiment.

FIG. 3 is a flow chart illustrating a process 40 for introducing a one-time programmed pattern into a memory device's memory array and a process 42 for using the programmed pattern, in accordance with an embodiment. Starting first with the process 40 for introducing a one-time programmed pattern into a memory array, a desired pattern is determined (block 44). The pattern may indicate configuration settings, encryption/decryption keys, computer-readable instructions, etc. that may facilitate further data processing. In some embodiments, the pattern may be a binary sequence.

Once the pattern is determined, the transistors of the memory array to be programmed are identified (block 46). As discussed herein, once programmed, the programmed transistors may be subsequently identified to acquire the programmed pattern in the memory array.

Once the to-be-programmed transistors are identified, a hot-carrier injection (HCI) process is applied to these transistors (block 48). The HCI process is discussed in more detail below with regard to FIGS. 4A and 4B. The HCI process results in a minor degradation of identified transistors, resulting in modifications to the threshold voltage (Vth) of these transistors. This, in essence, may act as a programming of the identified transistors, resulting in the patterned memory device 14. Accordingly, when each of the programmed transistors is subsequently identified, the programmed pattern may emerge, enabling additional data processing functionality based upon the programmed pattern without using additional space for fuses, anti-fuses, or other one-time programming mechanisms that use valuable area on the memory device 14.

Figure 6B:
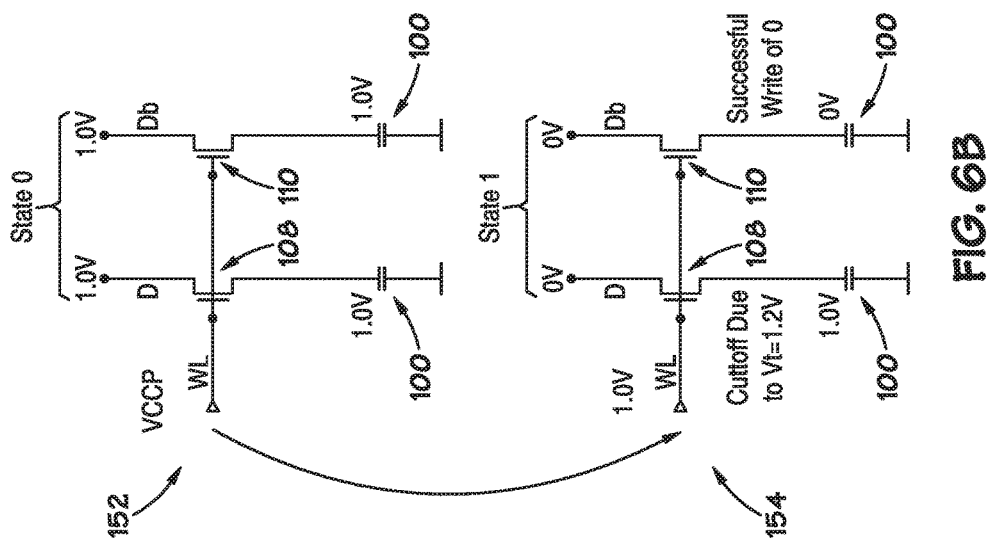
FIG. 6B is a schematic diagram illustrating memory cell states during the process of FIG. 6A.
Figure 6A:
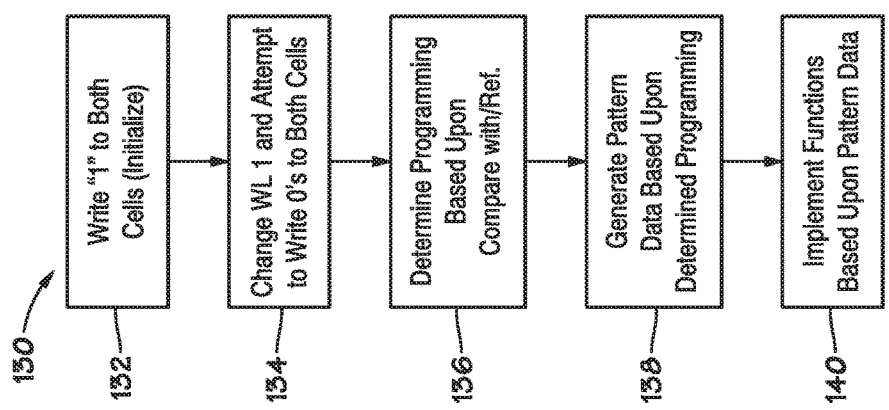
FIG. 6A is a flowchart illustrating a process for detecting programmed memory cells, in accordance with an embodiment.

Turning now to the process 42 for using the programmed pattern, the patterned memory device 14 is analyzed to identify programmed transistors (block 50). A process for identifying programmed transistors is depicted in FIG. 6A and the states of the transistors during the process of FIG. 6A are depicted in FIG. 6B.

Once the programmed pattern is identified, the pattern may be used to perform an action (block 52). As mentioned above, the pattern may indicate an encryption/decryption key for the memory device 14. Accordingly, the pattern may facilitate encryption and/or decryption of data of the memory device 14 via the encryption/decryption key indicated by the pattern. Additionally and/or alternatively, the pattern may provide machine-readable instructions to be implemented by circuitry of an electronic device. For example, the pattern may provide a boot-up sequence for an electronic device associated with the memory device 14. Additionally and/or alternatively, the patterns may indicate configuration settings for the memory device 14. For example, in some embodiments, the pattern may indicate timings to be used for the memory device 14 (e.g., ×4, ×8, ×16 timings, etc.). As may be appreciated, the current techniques facilitate these functionalities with reduced area utilization, by reducing a number of fuses, anti-fuses, etc. needed to provide indications that the programmed pattern may provide.

Figure 4A:
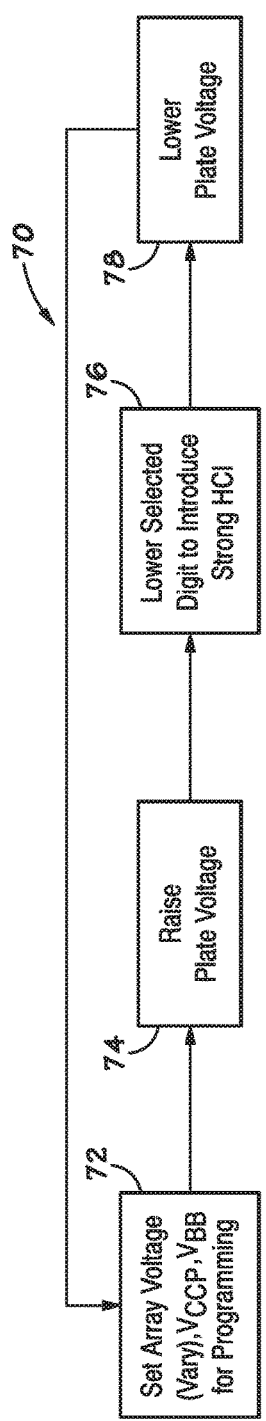
FIG. 4A is a flow chart illustrating a process for performing hot-carrier injection (HCI) on a memory cell, in accordance with an embodiment.
Figure 4B:
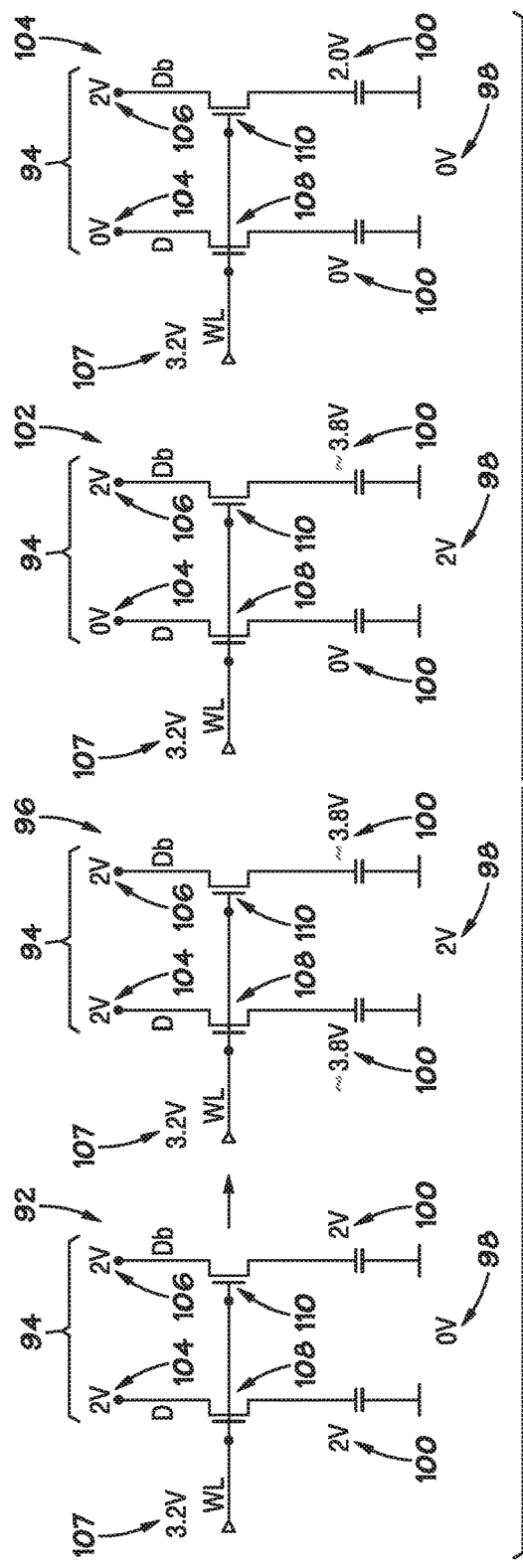
FIG. 4B is a schematic diagram illustrating memory cell states that correspond to process blocks of FIG. 4A, in accordance with an embodiment.
Figure 5:
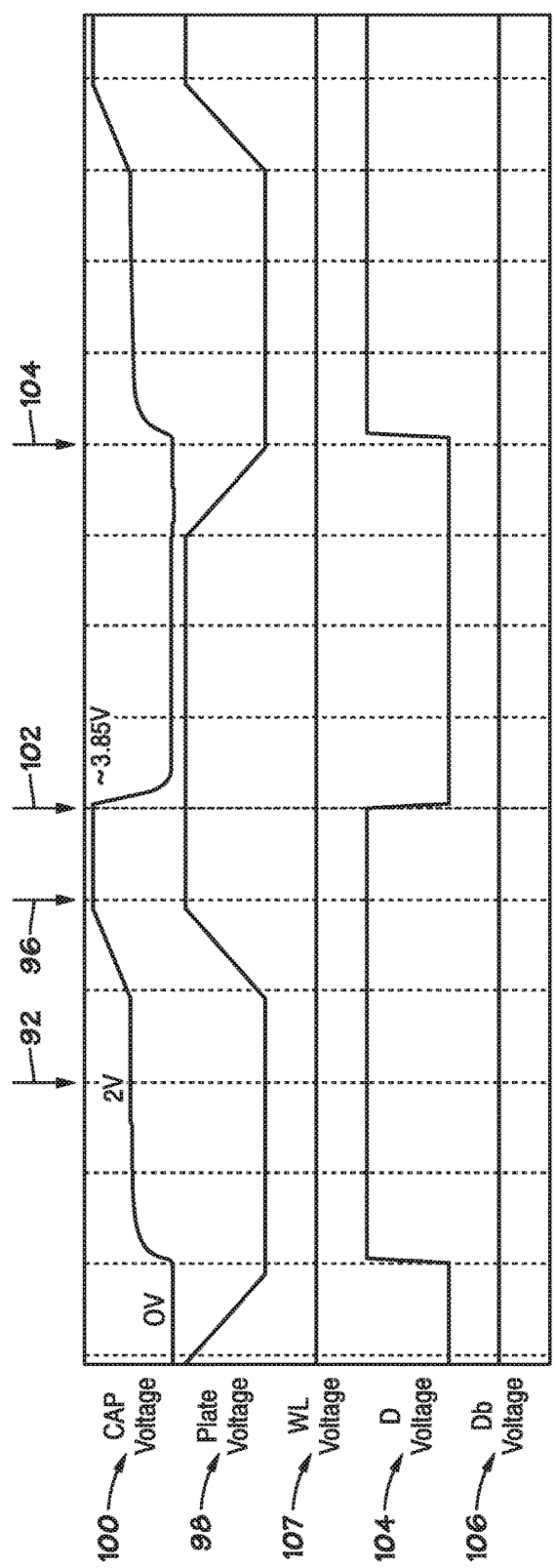
FIG. 5 is a timing diagram illustrating voltage values during the process of FIG. 4A, in accordance with an embodiment.

Turning now to a more detailed discussion of the programming process, FIG. 4A is a flow chart illustrating a process for performing hot-carrier injection (HCI) on a memory cell, in accordance with an embodiment. Further, FIG. 4B is a schematic diagram illustrating a progression 90 of memory cell states that correspond to process blocks of FIG. 4A, in accordance with an embodiment. FIG. 5 is a timing diagram illustrating voltage values during the process of FIG. 4A, in accordance with an embodiment.

The process 70 begins by preparing the memory array for programming. To do this, the voltage provided to the memory array (Vary) (e.g., digit voltage 104 and 106), the boosted word line voltage (Vccp) 107, and the pumped substrate voltage (Vbb) are set. For example, in some embodiments, Vary may be raised from 1V to 2.0V. Further, Vccp may be raised from 2.9V to 3.2V. Vbb may be lowered from −0.6V to −1.2V. This initialization of the memory cell is illustrated in the initialization state 92 of the two-transistor/two-capacitor (2T2C) memory cell 94 of FIGS. 4B and 5. While FIG. 4B illustrates a 2T2C memory cell, this is not intended to limit programming to 2T2C memory cells. Indeed, other memory cell types (e.g., 1T1C memory cells) may be programmed using a similar technique, as one of ordinary skill in the art would appreciate.

Once the memory cell is initialized for programming, the plate voltage is raised (block 74). For example, as depicted in state 96 of the memory cell 94, the plate voltage 98 is raised from 0V to 2V between the initialization state 92 and the state 96. This shift in the plate voltage 98 causes the capacitor voltage 100 to shift from 2V to approximately 3.8 volts, as depicted in state 96 (for both digits D and Db) of FIGS. 4B and 5.

The process 70 continues by lowering the selected digit (e.g., the digit to be programmed) to introduce a strong hot-carrier injection (HCI) (block 76). As illustrated in state 102 of FIGS. 4B and 5, the digit voltage 104 for D (the digit to be programmed) is reduced from 2V to 0V, while the digit voltage 106 for Db remains 2V. This shift in digit voltage 104 causes the hot-carrier injection on the transistor 108. However, because the digit voltage 106 remains constant, there is no HCI on the transistor 110. Accordingly, the threshold voltage change in transistor 108 may be identified by referencing the unchanged threshold voltage of transistor 110. In 1T1C embodiments, a transistor from another cell in the memory array may be used as a reference for the changed threshold voltage of the programmed transistor.

Once the HCI has been introduced, the plate voltage 98 may be reduced to return to the value at the initialization state 92. For example, as illustrated in state 104 of FIGS. 4B and 5, the plate voltage 98 is lowered from 2V to 0V. Multiple iterations of HCI may be performed to reach a desired level of threshold voltage (Vth) change. Accordingly, the process 70 may be repeated until the desired amount of Vth modification is introduced. In certain embodiments, the Vth modification target may be 200-300 mV of change. The process 70 may repeat (e.g., 1000 cycles) to introduce this target amount of Vth change. In some embodiments, a Vth modification check may be introduced after a certain number of cycles (e.g., every 100 cycles) of the process 70 to determine an amount of Vth change. Once the check determines that the proper amount of Vth change has been reached, the process 70 cycles are halted.

Turning now to a discussion regarding reading programmed memory cells, FIG. 6A is a flowchart illustrating a process for detecting programmed memory cells, in accordance with an embodiment. FIG. 6B is a schematic diagram illustrating memory cell states 150 during the process of FIG. 6A.

The process 130 begins by initializing the memory cells for reading the programming (block 132). To do this, a "1" is written to both digits/cells. The initialization state 152 (e.g. "State 0") for a 2T2C memory cell is illustrated in FIG. 6B. As illustrated, both digit D and digit Db are set to 1.0V. Because the word line voltage (WL) is set to Vccp, the transistors 108 and 110 close, causing the capacitor voltage 100 of both digits D and Db move to 1.0V.

Next, the process 130 continues by changing the word-line voltage (WL) and attempting to write "0" to both digits (block 134). The word-line voltage (WL) is reduced to a voltage that enables closure of the gate of the programmed transistor that HCI was applied to (e.g., D), while causing an open gate on the reference transistor (e.g., Db). For example, in state 154 of the embodiment depicted in FIG. 6B, the HCI causes the Vth of the transistor 108 to equal 1.2V, while the Vth of the reference transistor 110 has a Vth equal to or less than 1.0V. Accordingly, when the word-line voltage (WL) is set to 1.0 V and a "0" is written to both D and Db, the capacitor charge 100 of D remains 1.0V because the transistor 108 is closed, while the capacitor charge 100 of Db transitions to 0V, because the transistor 110 is open.

Based upon a comparison between the reference (e.g., Db) and the potentially programmed digit/cell (e.g., D), a determination as to whether the digit/cell is programmed may be made (block 136). For example, because the capacitor charge 100 of D (e.g., 1.0V) is different from the capacitor charge 100 of Db (e.g., 0V) in state 154. Accordingly, the OTP detection circuitry may determine that the digit D was programmed.

The programming determination may be made for all or a subset of the memory cells of an array. Once the programming determination is made for the relevant memory cells, the programming determination for all of the relevant cells may result in pattern data. For example, in some embodiments, programmed memory cells may act as a "1" and un-programmed cells may represent a "0" in pattern data. In some embodiments, these "1s" and "0s" may form binary data that may be used for subsequent processes. The position/location of the programmed/un-programmed cells/digits may, therefore, provide a valuable pattern of data, such as a binary data string.

Once the pattern data is determined, the pattern data may be used to facilitate implementation of subsequent functionality (block 140). For example, the pattern data may provide an encryption and/or decryption key, which may be used to encrypt and/or decrypt data. In some embodiments, the pattern data may provide computer-readable instructions to be implemented by an electronic device, such as bootloader instructions. The electronic device may implement the bootloader based upon the instructions provided by the pattern data. In some embodiments, the pattern data may provide configuration settings for the memory device. Memory operations (e.g., read, write, etc.) may be implemented based upon these configuration settings.

As may be appreciated, the current techniques provide a significant advantage over traditional one-time programming of memory devices. By taking the typically undesired characteristic of hot-carrier injection and using it to represent data, a new layer of data may be introduced into memory devices without using additional circuit area. Further, in some instances, this data may replace data that was traditionally stored by fuses/anti-fuses on the memory devices, enabling the removal of these fuses/anti-fuses to free-up area for larger memory arrays and/or other circuitry.

While the embodiments described herein may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the techniques and system described in the disclosure as defined by the following appended claims.

What is claimed is:

1. A memory device comprising:
a memory array, the memory array comprising:
a set of memory cells, each memory cell of the set of memory cells comprising at least one transistor and at least one capacitor; and
a programmed memory cell, comprising a memory cell of the set of memory cells that is selectively programmed by applying hot-carrier injection (HCI) to a transistor of the programmed memory cell, wherein the HCI was applied by repetitively performing an HCI application cycle until a target threshold voltage (Vth) change was reached.

2. The memory device of claim 1, comprising:
a reference transistor that is not programmed by applying HCI to the reference transistor.

3. The memory device of claim 2, wherein:
the set of memory cells comprise 1T1C memory cells each comprising one transistor and one capacitor; and
the reference transistor is disposed in a reference memory cell different from the programmed cell.

4. The memory device of claim 2, wherein:
the set of memory cells comprise 2T2C memory cells each comprising two transistors and two capacitors; and
the reference transistor is disposed in a programmed memory cell different from the programmed cell.

5. The memory device of claim 1, comprising:
a plurality of programmed memory cells; and
a plurality of un-programmed memory cells that have not be programmed by applying HCI and are not a reference for the plurality of programmed memory cells.

6. The memory device of claim 5, wherein:
the plurality of programmed memory cells and the plurality of un-programmed memory cells provide pattern data to be used in data processing functionality.

7. The memory device of claim 6, wherein the pattern data comprises binary data to be used in the data processing functionality.

8. The memory device of claim 6, wherein the pattern data comprises an encryption key, a decryption key, or both.

9. The memory device of claim 6, wherein the pattern data comprises an encryption key, a decryption key, or both.

10. The memory device of claim 6, wherein the pattern data comprises computer-readable instructions to be implemented by an electronic device.

11. The memory device of claim 6, wherein the pattern data comprises an indication of configuration settings for the memory device.

12. The memory device of claim 11, wherein the indication of configuration settings comprises one or more timings to be used for the memory device.

13. One-time programming (OTP) injection circuitry, comprising circuitry configured to:
program at least one memory cell of a memory array by applying hot-carrier injection (HCI) to a transistor of the at least one memory cell via circuitry configured to repetitively perform an HCI application cycle until a target threshold voltage (Vth) change is reached.

14. The OTP injection circuitry of claim 13, comprising circuitry configured to:
determine a desired pattern to introduce into the memory array;
identify memory cells of the memory array to be programmed to form the desired pattern; and
applying the HCI to each of the identified memory cells of the memory area to be programmed.

15. The OTP injection circuitry of claim 13, comprising circuitry configured to:
perform the HCI application cycle, by:
raising a plate voltage of the at least one memory cell;
then introducing a strong HCI to the at least one memory cell; and
then lowering the plate voltage of the at least one memory cell.

16. The OTP injection circuitry of claim 13, wherein the target threshold voltage (Vth) change comprises a range of 200-300 mV.

17. A method, comprising:
identifying one or more programmed memory cells of a memory array, wherein the one or more programmed memory cells are programmed by applying hot-carrier injection (HCI) to a transistor of the one or more programmed memory cells, wherein at least a portion of the one or more programmed memory cells of the memory array were programmed by repetitively performing an HCI application cycle until a target threshold voltage (Vth) change was reached;

based upon the one or more programmed memory cells, identifying programmed pattern data; and implementing one or more data processing functions based upon the programmed pattern data.

18. The method of claim 17, wherein programming the one or more memory cells comprises:

initializing the one or more memory cells for programming;

then raising a plate voltage of the one or more memory cells;

then lowering a selected digit of the one or more memory cells to introduce a strong HCI; and then lowering the plate voltage of the one or more memory cells.

19. The method of claim 17, comprising:

based upon the programmed pattern data: implementing decryption, implementing encryption, implementing a boot-up routine, implementing a particular memory device operating mode, or any combination thereof.

* * * * *